US011856919B2

(12) United States Patent
Malooley (10) Patent No.: US 11,856,919 B2
(45) Date of Patent: *Jan. 2, 2024

(54) FISH HOOK APPARATUS

(71) Applicant: LIVE LURES LLC, Lawrenceville, GA (US)

(72) Inventor: Joseph Malooley, Lawrenceville, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/729,724

(22) Filed: Apr. 26, 2022

(65) Prior Publication Data

US 2022/0248650 A1 Aug. 11, 2022

Related U.S. Application Data

(63) Continuation of application No. 16/728,531, filed on Dec. 27, 2019, now Pat. No. 11,337,410.

(60) Provisional application No. 62/749,949, filed on Oct. 24, 2018.

(51) Int. Cl.
*A01K 83/06* (2006.01)
*A01K 91/04* (2006.01)

(52) U.S. Cl.
CPC ............. *A01K 83/06* (2013.01); *A01K 91/04* (2013.01)

(58) Field of Classification Search
CPC ...... A01K 83/06; A01K 91/04; A01K 85/028; A01K 85/1833
USPC ........................................................ 43/44.2
See application file for complete search history.

(56) References Cited

U.S. PATENT DOCUMENTS

| | | | | |
|---|---|---|---|---|
| 2,290,433 A * | 7/1942 | Jeffers | ............. | A01K 85/16 43/42.26 |
| 3,205,608 A * | 9/1965 | Dickinson | ............. | A01K 85/16 43/42.49 |
| 3,905,149 A * | 9/1975 | McCloud | ............. | A01K 83/06 43/44.8 |
| 4,619,069 A * | 10/1986 | Strickland | ............. | A01K 85/00 43/42.26 |
| 4,777,758 A * | 10/1988 | Phillips | ............. | A01K 85/02 43/43.2 |
| 4,841,665 A * | 6/1989 | McGahee | ............. | A01K 85/00 43/42.24 |
| 5,220,743 A * | 6/1993 | McClellan | ............. | A01K 85/00 43/42.38 |
| 5,548,920 A * | 8/1996 | Peddycoart | ............. | A01K 85/10 43/44.2 |

(Continued)

*Primary Examiner* — Philip J Bonzell
*Assistant Examiner* — Maria E Graber
(74) *Attorney, Agent, or Firm* — Smith Tempel Blaha LLC; Matthew T. Hoots (57) ABSTRACT

A fish hook apparatus including a head member, a shank, a bend section, a point element, and securing elements and a method for producing a controllable action in a bait are provided. The head member is defined by a top nose element, opposing side walls, and a bottom end. The head member includes a channel with openings at the top nose element and an opposing side wall for passing a fishing line. A securing element, coupled to the bottom end of the head member, secures a head of the bait. Another securing element, coupled to any location of the bait, secures one end of the fishing line exiting from the head member to the bait. Controllably tugging the fishing line curls the secured bait backwards towards the head member and springs the secured bait forwards to produce a controllable action, for example, a worm-like action in the bait.

14 Claims, 13 Drawing Sheets

(56) References Cited

U.S. PATENT DOCUMENTS

| | | | | |
|---|---|---|---|---|
| 5,649,384 A * | 7/1997 | Manning | ............... | A01K 85/00 43/42.39 |
| 6,519,895 B1 * | 2/2003 | Bennett | ................. | A01K 83/00 43/43.16 |
| 7,954,274 B2 * | 6/2011 | MacDonald | ........... | A01K 85/00 43/42.24 |
| 10,206,381 B2 * | 2/2019 | Rice | ....................... | A01K 85/00 |
| 10,492,478 B1 * | 12/2019 | Parks | ..................... | A01K 85/00 |
| 10,993,427 B2 * | 5/2021 | Brockhouse | ........... | A01K 97/24 |
| 11,337,410 B2 * | 5/2022 | Malooley | ............... | A01K 91/04 |
| 2011/0277371 A1 * | 11/2011 | Norman | ................ | A01K 85/01 43/42.06 |
| 2019/0133098 A1 * | 5/2019 | Lee | ....................... | A01K 83/06 |

\* cited by examiner

FISH HOOK APPARATUS

CROSS-REFERENCE TO RELATED APPLICATIONS

This application is a continuation of U.S. application Ser. No. 16/728,531 entitled FISH HOOK APPARATUS, filed on Dec. 27, 2019 and claiming priority to and the benefit of the provisional patent application entitled "Curlin' Worm", Application No. 62/749,949, filed in the United States Patent and Trademark Office on Oct. 24, 2018. The above referenced patent applications are hereby incorporated herein by reference in their entireties.

BACKGROUND

Technical Field

The embodiments herein, in general, relate to a fishing device. More particularly, the embodiments herein relate to a fish hook apparatus for producing a controllable action in a bait during fishing.

Description of the Related Art

A fish hook is a device for catching fish by piercing the mouth of the fish or capturing the body of the fish. A person who fishes, also referred to as an "angler", typically uses a fishing bait or a fishing lure for attracting the attention of the fish. The fishing bait typically uses color, movement, vibration, etc., to attract or bait the fish. Some fishing baits comprise one or more hooks for catching the fish when the fish strikes the fishing bait. Most fishing baits are tied off with a fishing line at the head of the fishing bait and pulled through the water back to the angler via a fishing reel of a fishing rod. The movement of pulling a fishing bait through the water provides the fishing bait its action for attracting the fish. The head of the fishing bait typically comprises a metal loop, herein referred to as an "eye", to which the fishing line is tied. An angler typically has to reel or pull the fishing bait through the water using the fishing reel to create action, for example, back and forth movements of the fishing bait, for attracting the fish, which requires substantial manual effort. Moreover, tying a fishing line through an eye of a conventional fishing bait does not provide an angler with sufficient control over the movement of the fishing bait in a strike zone of the water.

Hence, there is a long-felt need for a fish hook apparatus and a method for producing a controllable action, for example, a curling, worm-like action, in a bait during fishing. Moreover, there is a need for a fish hook apparatus and a method that allow an angler to create and control the action in the bait with minimal effort and without having to reel in the bait.

SUMMARY

This summary is provided to introduce a selection of concepts in a simplified form that are further disclosed in the detailed description. This summary is not intended to determine the scope of the claimed subject matter.

The fish hook apparatus and the method disclosed herein address the above-recited need for producing a controllable action, for example, a curling, worm-like action, in a bait during fishing. The fish hook apparatus and the method disclosed herein also allow an angler to create and control the action in the bait with minimal effort and without having to reel in the bait.

The fish hook apparatus disclosed herein comprises a head member, a shank, a bend section, a point element, and securing elements. The head member is defined by a top nose element, opposing side walls, and a bottom end. The head member comprises a channel configured to pass through the head member from the top nose element to one of the opposing side walls of the head member. The channel of the head member comprises a first opening and a second opening. The first opening is configured at the top nose element. The first opening is configured to receive a fishing line and pass the fishing line through the channel and out through the second opening. The second opening is configured at the opposing side wall. The second opening is configured to receive and exit the fishing line passed through the channel. The shank extends from the other opposing side wall of the head member. The bend section extends from the shank. The point element extends from the bend section. The point element is configured to pierce a bait. The bait comprises a head, a body, and a tail.

A first securing element, for example, a screw-type fastener such as a screw-type hitchhiker, is coupled to the bottom end of the head member. The first securing element is configured to secure a head of the bait. A second securing element, for example, a hook, is coupled to any one of multiple locations, for example, the body, the tail, etc., of the bait. The second securing element is configured to secure one end of the fishing line exiting from the second opening of the channel of the head member to the bait. The fish hook apparatus disclosed herein allows an angler to controllably tug the fishing line to curl the bait secured by the first securing element and the second securing element backwards towards the head member and to spring the bait forwards due to tension in the bait to produce a controllable action, for example, a curling, worm-like action, in the bait. The fish hook apparatus disclosed herein allows the angler to produce a controllable action in the bait in a strike zone of a water body without reeling the bait out of the strike zone.

BRIEF DESCRIPTION OF THE DRAWINGS

The foregoing summary, as well as the following detailed description, is better understood when read in conjunction with the accompanying drawings. For illustrating the embodiments herein, exemplary constructions of the embodiments are shown in the drawings. However, the embodiments herein are not limited to the specific structures and methods disclosed herein. The description of a structure or a method step referenced by a numeral in a drawing is applicable to the description of that structure or that method step shown by that same numeral in any subsequent drawing herein.

3

DETAILED DESCRIPTION

Figure 1:
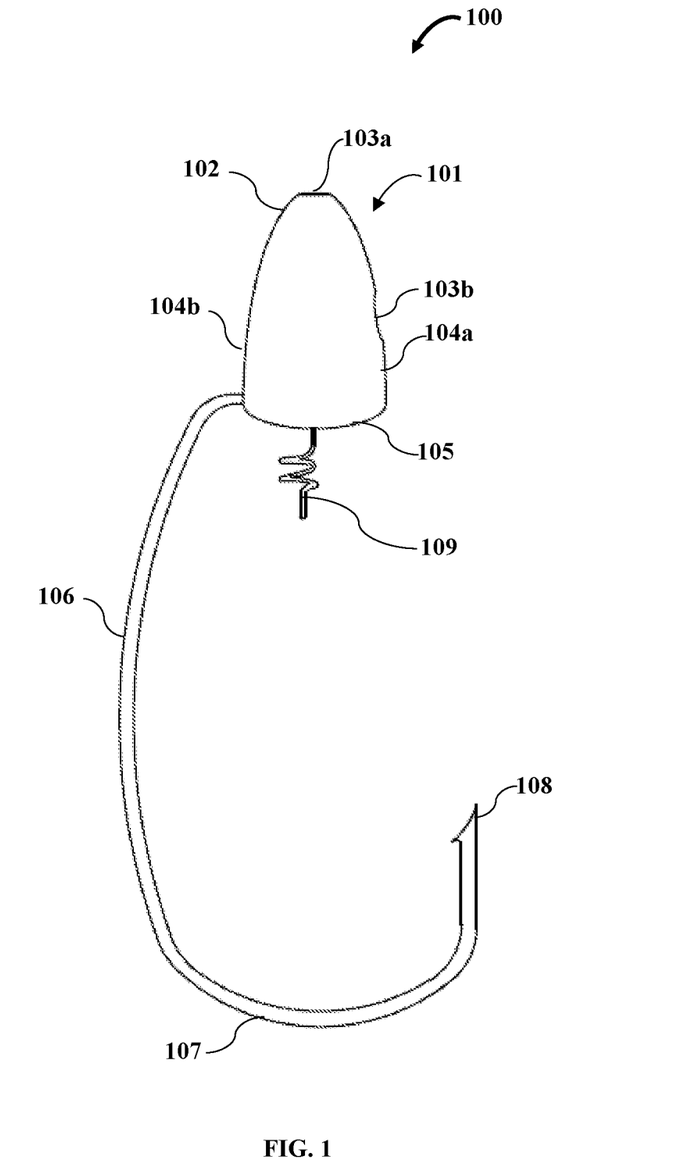
FIG. 1 illustrates a front elevation view of a fish hook apparatus, according to an embodiment herein.
Figure 2:
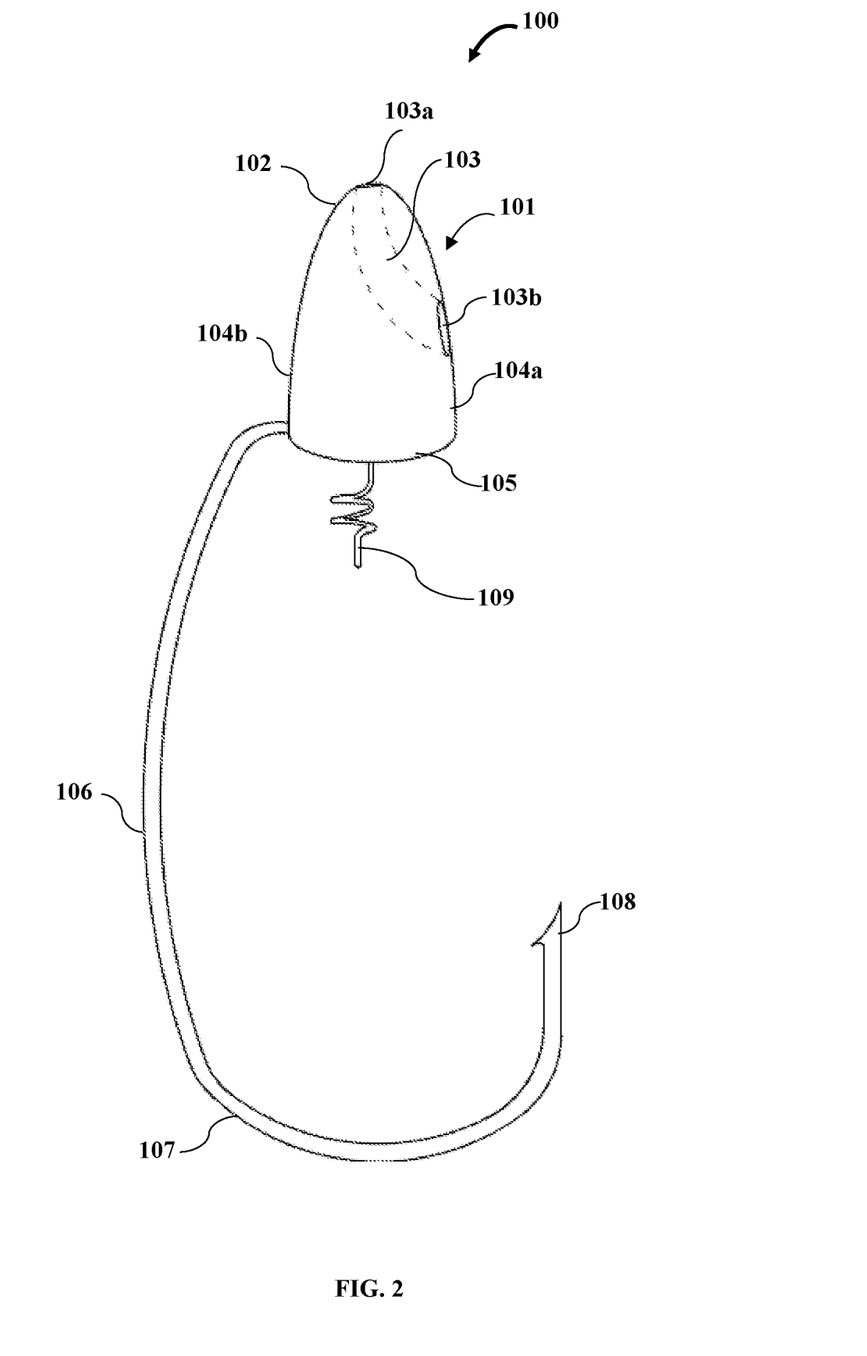
FIG. 2 illustrates a front perspective view of the fish hook apparatus, showing a channel configured to pass through a head member of the fish hook apparatus from a top nose element to an opposing side wall of the head member, according to an embodiment herein.

FIG. 1 illustrates a front elevation view of a fish hook apparatus 100, according to an embodiment herein. The fish hook apparatus 100 disclosed herein comprises a head member 101, a shank 106, a bend section 107, a point element 108, and securing elements 109 and 110 illustrated in FIGS. 1-2 and FIG. 5B respectively. The head member 101 is defined by a top nose element 102, opposing side walls 104a and 104b, and a bottom end 105. The head member 101 allows connection of a fishing line to the fish hook apparatus 100. The head member 101 is, for example, made of lead. The head member 101 comprises a channel 103 as illustrated in FIG. 2, configured to pass through the head member 101 from the top nose element 102 to one of the opposing side walls, for example, 104a, of the head member 101. In an embodiment, the channel 103 of the head member 101 comprises openings or holes, for example, a first opening 103a and a second opening 103b. The first opening 103a is configured at the top nose element 102. The first opening 103a is configured to receive a fishing line and pass the fishing line through the channel 103 and out through the second opening 103b. The second opening 103b is configured at the opposing side wall 104a. The second opening 103b is configured to receive and exit the fishing line passed through the channel 103. The shank 106 extends from the other opposing side wall 104b of the head member 101. In an embodiment, the shank 106 is molded to the head member 101. The shank 106 connects the bend section 107 to the head member 101. The bend section 107 extends from the shank 106. The bend section 107 is a curved portion of the fish hook apparatus 100. The point element 108 extends from the bend section 107 in an upward direction as illustrated in FIG. 1. The point element 108 is a sharp element configured to pierce a bait, for example, a soft plastic bait, a live worm, grub, etc.

A first securing element 109, for example, a screw-type fastener such as a screw-type hitchhiker, is coupled to the bottom end 105 of the head member 101. In an embodiment, the first securing element 109 is molded to the bottom end 105 of the head member 101. The first securing element 109 is configured to secure a head of the bait. In an embodiment, the first securing element 109 is configured as a screw lock bait keeper for attaching the bait to the fish hook apparatus

4

100. The first securing element 109 screws the head of the bait onto the fish hook apparatus 100. A second securing element 110, for example, a hook or another screw-type hitchhiker, is coupled or screwed to any one of multiple locations, for example, the body, the tail, etc., of the bait. The second securing element 110 is configured to secure one end of the fishing line exiting from the second opening 103b of the channel 103 of the head member 101 to the bait. The fish hook apparatus 100 disclosed herein allows a user of the fish hook apparatus 100, for example, an angler, to controllably tug the fishing line to curl the bait secured by the first securing element 109 and the second securing element 110 backwards towards the head member 101 and to spring the bait forwards due to tension in the bait to produce a controllable action, for example, a curling, worm-like action, in the bait. The fish hook apparatus 100 disclosed herein allows the angler to produce a controllable action, for example, a curling, worm-like action, in the bait in a strike zone of a water body without reeling the bait out of the strike zone.

FIG. 2 illustrates a front perspective view of the fish hook apparatus 100, showing a channel 103 configured to pass through the head member 101 of the fish hook apparatus 100 from the top nose element 102 to the opposing side wall 104a of the head member 101, according to an embodiment herein. The channel 103 is configured within the head member 101 and extends from the opening 103a in the top nose element 102 to the opening 103b in the opposing side wall 104a. The channel 103, therefore, passes through the top nose element 102 and out through the opposing side wall 104a of the head member 101. The channel 103 allows a fishing line to be fed through the top nose element 102 and out the opposing side wall 104a of the head member 101. That is, the channel 103 allows the fishing line received through the opening 103a in the top nose element 102 of the head member 101 to pass through and exit from the opening 103b at the opposing side wall 104a of the head member 101.

Figure 3:
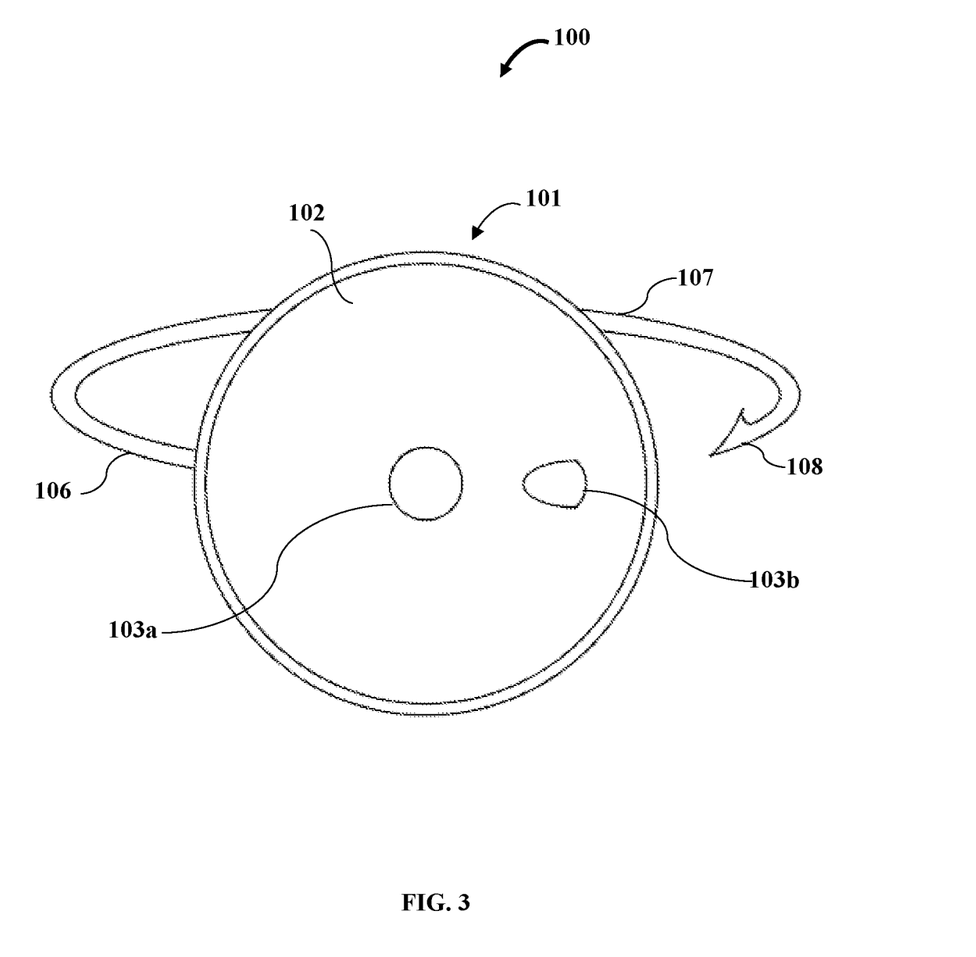
FIG. 3 illustrates a top perspective view of the fish hook apparatus, showing openings configured in the head member of the fish hook apparatus, according to an embodiment herein.

FIG. 3 illustrates a top perspective view of the fish hook apparatus 100, showing the openings 103a and 103b configured in the head member 101 of the fish hook apparatus 100, according to an embodiment herein. The opening 103a is configured at the top nose element 102 and the opening 103b is configured at the opposing side wall 104a of the head member 101 as illustrated in FIGS. 1-2. An angler inserts one end of the fishing line through the opening 103a in the top nose element 102. The opening 103a in the top nose element 102 receives the fishing line and passes the fishing line through the channel 103 illustrated in FIG. 2 and out through the other opening 103b. The opening 103b at the opposing side wall 104a of the head member 101 receives and exits the fishing line passed through the channel 103.

Figure 4:
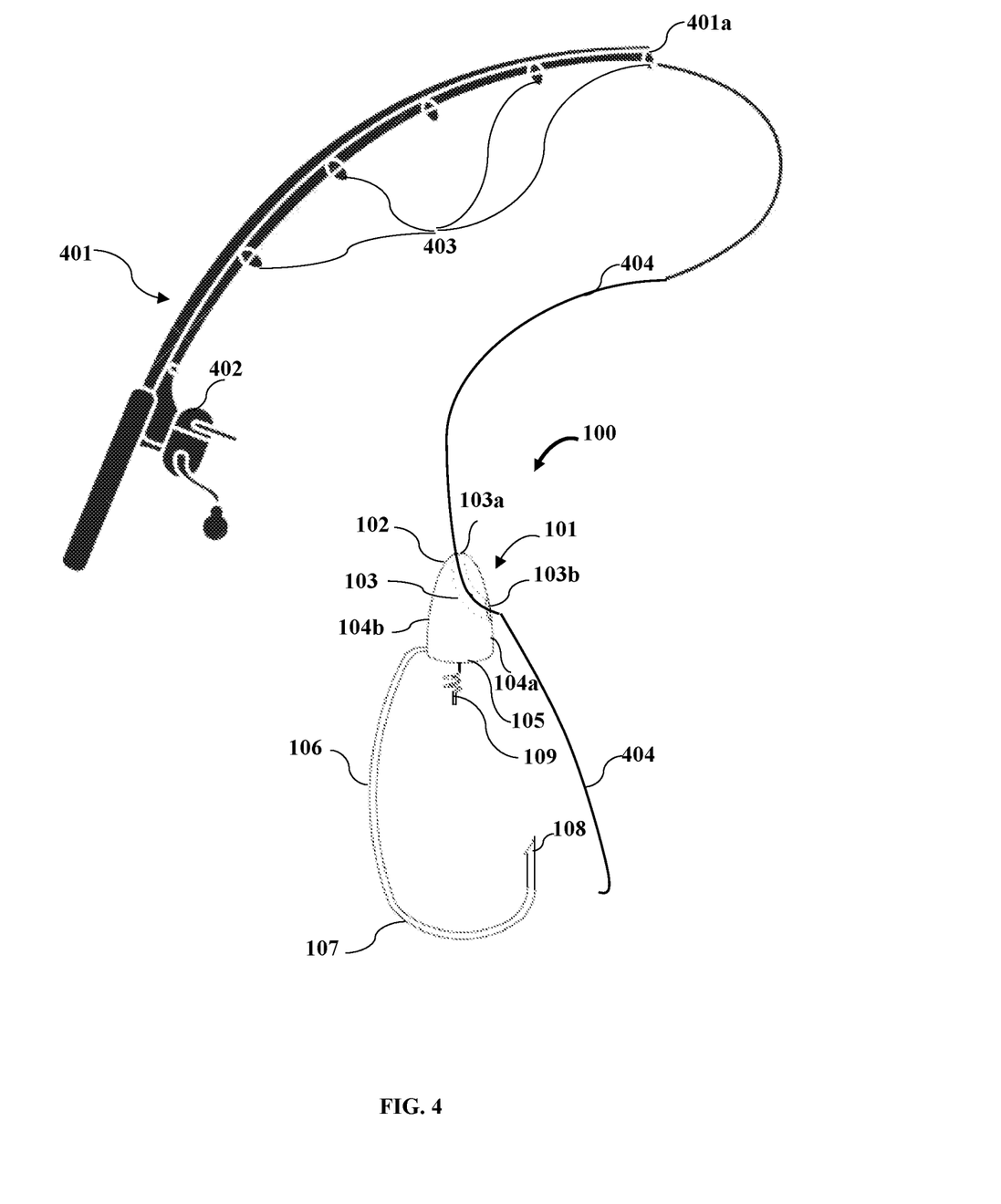
FIG. 4 illustrates an enlarged, front perspective view of the fish hook apparatus, showing a fishing line of a fishing rod, passing through the openings configured in the head member of the fish hook apparatus, according to an embodiment herein.

FIG. 4 illustrates an enlarged, front perspective view of the fish hook apparatus 100, showing a fishing line 404 of a fishing rod 401, passing through the openings 103a and 103b configured in the head member 101 of the fish hook apparatus 100, according to an embodiment herein. The fishing rod 401 comprises a reel 402 and guides 403. The guides 403 run the length of the fishing rod 401 and guide the fishing line 404 from the reel 402 to a tip 401a of the fishing rod 401. The reel 402 contains a spool of the fishing line 404. Using a button or another element positioned on the reel 402, an angler releases the fishing line 404 from the reel 402 and passes the fishing line 404 through the guides 403 until the fishing line 404 extends from the tip 401a of the fishing rod 401. The angler then inserts one end of the fishing line 404 into the opening 103a at the top nose element 102 of the head member 101 and passes the fishing line 404 through the channel 103 towards the opening 103b on the opposing side wall 104a of the head member 101. The channel 103 allows the fishing line 404 to feed through the top nose element 102 and out the opposing side wall 104a of the head member 101.

Figure 5A:
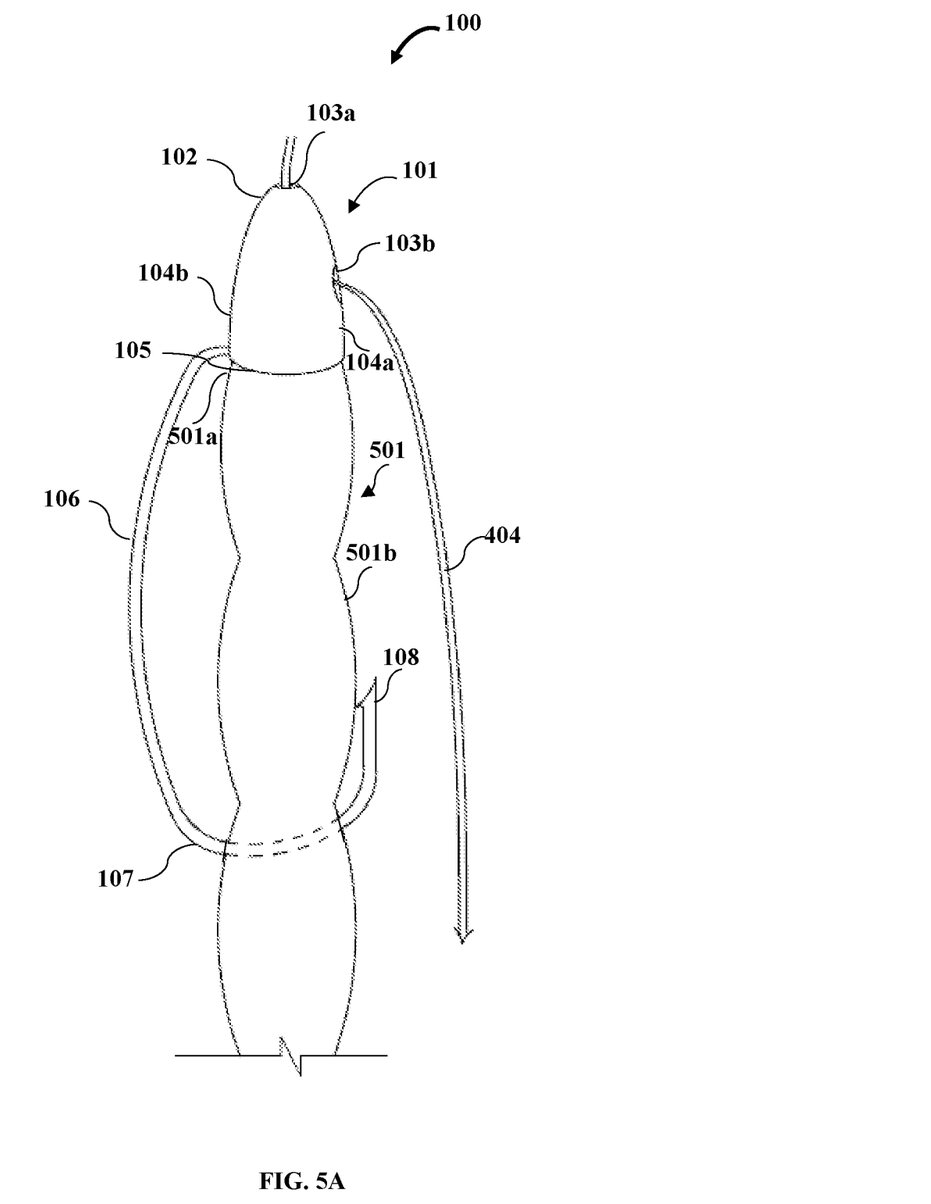
FIG. 5A illustrates a front perspective view of the fish hook apparatus, showing a bait attached to a bottom end of the head member, according to an embodiment herein.
Figure 5B:
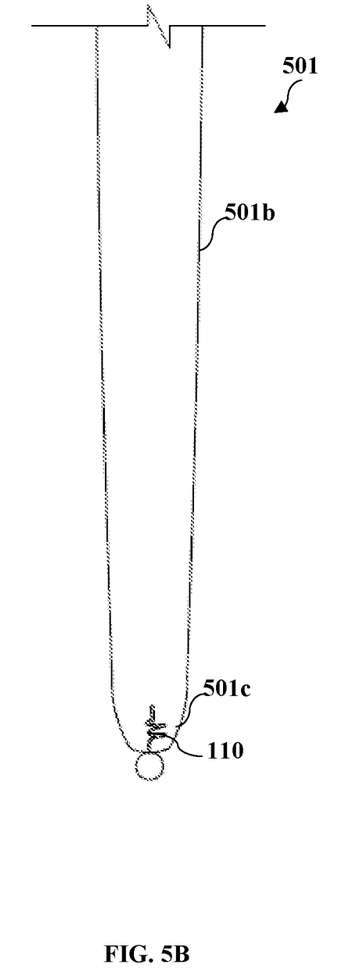
FIG. 5B illustrates a front perspective view of a tail of the bait, showing a securing element coupled to the tail of the bait, according to an embodiment herein.

FIG. 5A illustrates a front perspective view of the fish hook apparatus 100, showing a bait 501 attached to a bottom end 105 of the head member 101, according to an embodiment herein. FIG. 5A also illustrates the fishing line 404 passing through the openings 103a and 103b configured in the head member 101, according to an embodiment herein. In an embodiment, the bait 501 used for attracting fish comprises a head 501a, a body 501b, and a tail 501c. FIG. 5B illustrates a front perspective view of the tail 501c of the bait 501, showing a securing element 110, for example, a hook, coupled to the tail 501c of the bait 501, according to an embodiment herein.

Figure 5C:
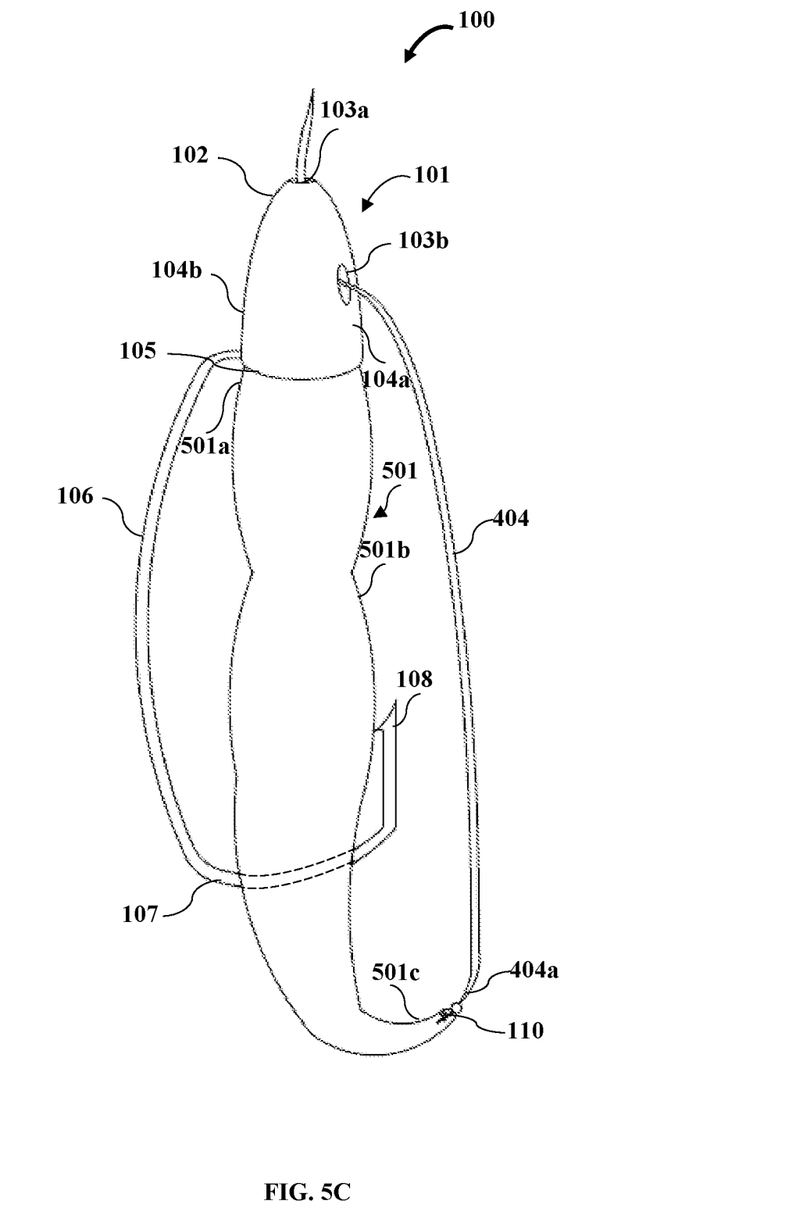
FIG. 5C illustrates a front perspective view of the fish hook apparatus, showing the bait attached to the bottom end of the head member and the fishing line coupled to the tail of the bait using the securing element, according to an embodiment herein.

FIG. 5C illustrates a front perspective view of the fish hook apparatus 100, showing the bait 501 attached to the bottom end 105 of the head member 101 and the fishing line 404 coupled to the tail 501c of the bait 501 using the securing element 110, according to an embodiment herein. In an embodiment, the securing element 109 illustrated in FIG. 4, extends from the bottom end 105 of the head member 101. The securing element 109 is, for example, a screw-type fastener such as a screw-type hitchhiker as illustrated in FIG. 4. The screw-type hitchhiker is a spring-type device. The head 501a of the bait 501 is screwed and fastened to the head member 101 via the securing element 109. The securing element 109 secures the head 501a of the bait 501. The end 404a of the fishing line 404 that exits the opening 103b in the opposing side wall 104a of the head member 101 is coupled to the securing element 110 that is coupled to the tail 501c of the bait 501. The securing element 110, therefore, couples the end 404a of the fishing line 404 to the tail 501c of the bait 501. In an embodiment, the securing element 110 is attached to the end 404a of the fishing line 404 and hooked or screwed into the tail 501c of the bait 501. In an embodiment (not shown), the fishing line 404 is coupled to any part of the body 501b of the bait 501 using the securing element 110.

Figure 6A:
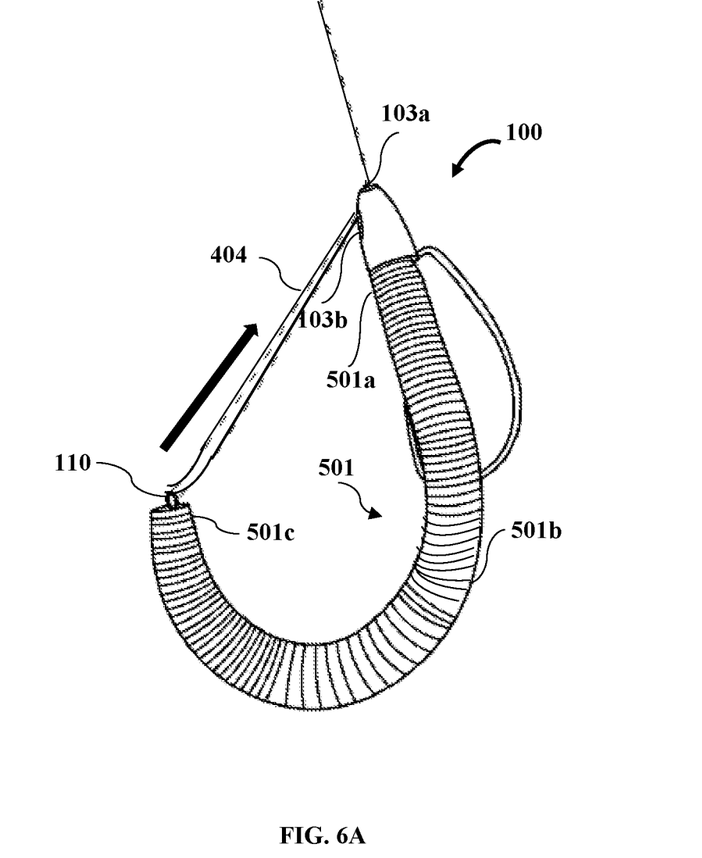
FIGS. 6A-6E illustrate front perspective views of the fish hook apparatus, showing a production of a controllable action in the bait attached to the fish hook apparatus, according to an embodiment herein.
Figure 6B:
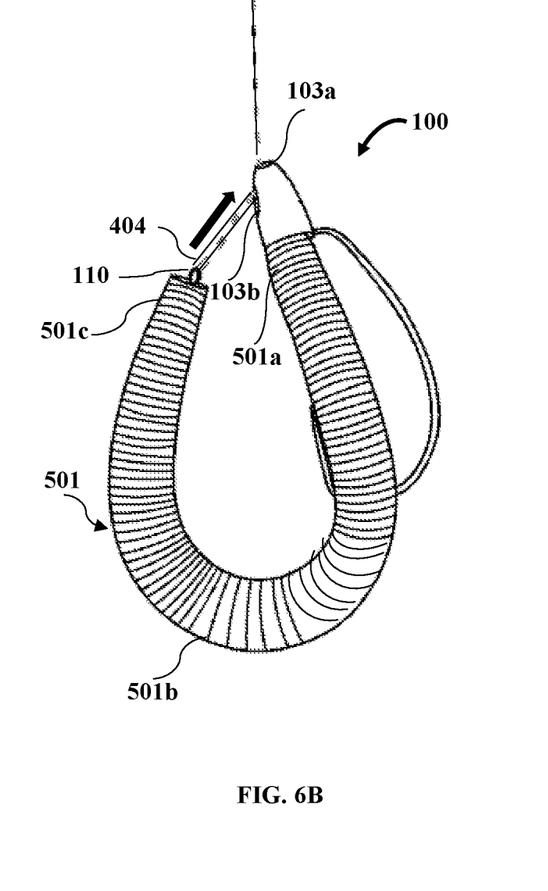
Figure 6C:
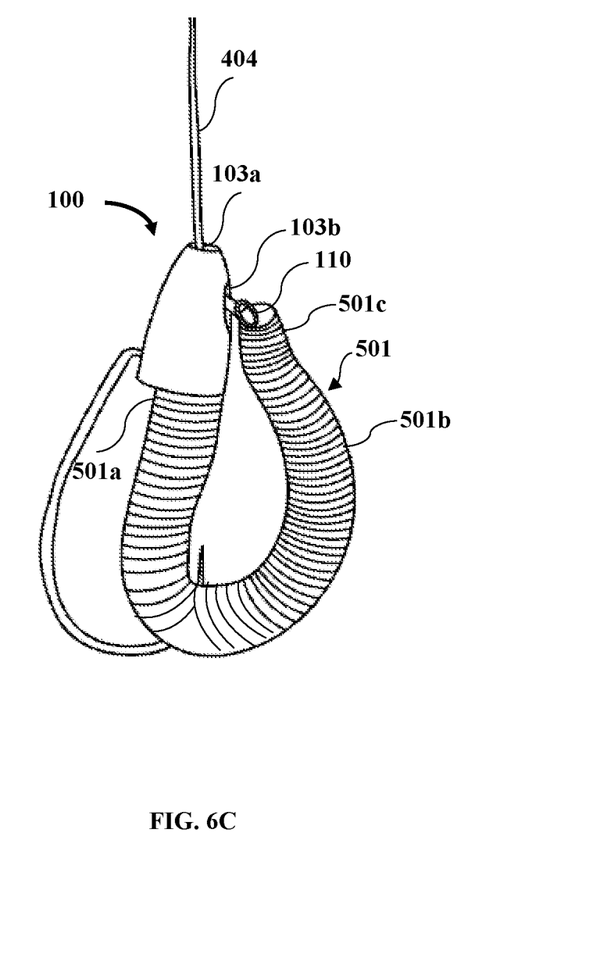
Figure 6D:
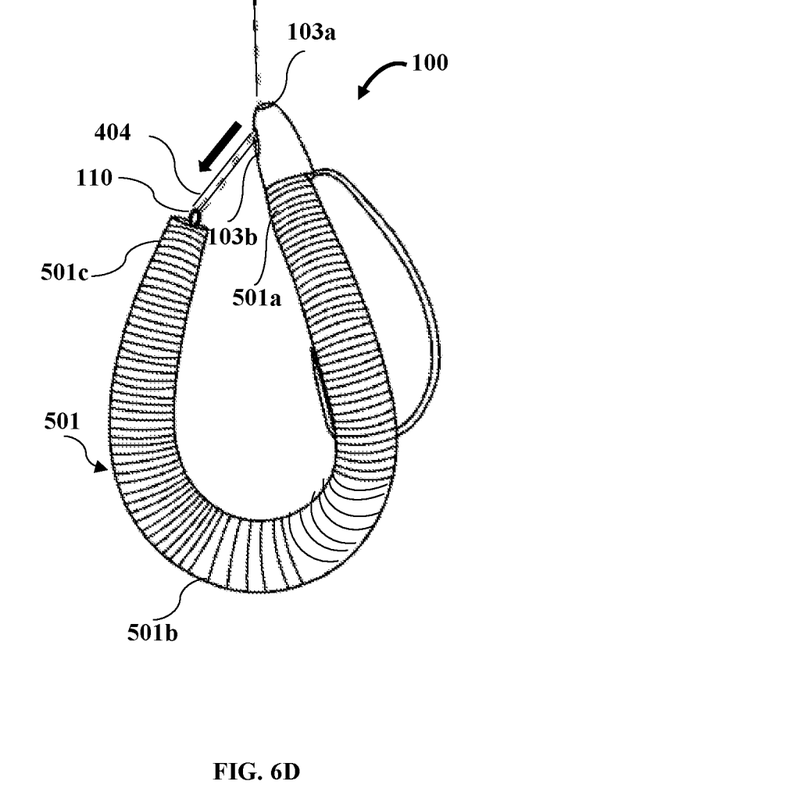
Figure 6E:
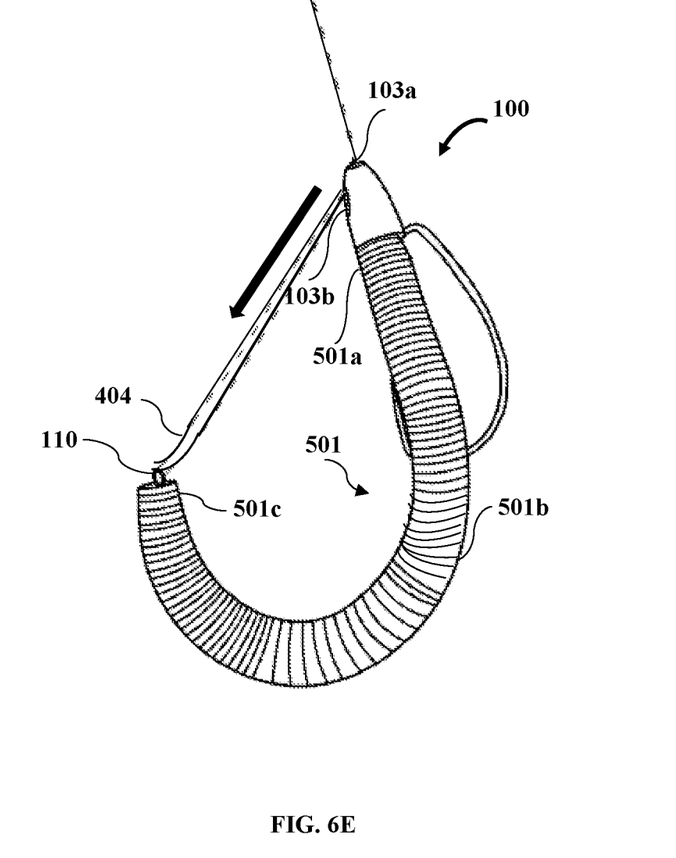

FIGS. 6A-6E illustrates front perspective views of the fish hook apparatus 100, showing a production of a controllable action in the bait 501 attached to the fish hook apparatus 100, according to an embodiment herein. An angler controllably tugs the fishing line 404 to curl the bait 501 secured by the securing elements 109 and 110 backwards towards the head member 101 as illustrated in FIGS. 6A-6C, and to spring the bait 501 forwards due to tension in the bait 501 as illustrated in FIGS. 6D-6E, to produce a controllable action, for example, a curling, worm-like action, in the bait 501. When the tip 401a of the fishing rod 401 illustrated in FIG. 4 is tugged, the bait 501 curls back up to the head member 101 as illustrated in FIG. 6C. For purposes of illustration, the detailed description refers to production of a curling, worm-like action using the fish hook apparatus 100 and the fishing line 404; however the scope of the fish hook apparatus 100 and the method disclosed herein is not limited to production of a curling, worm-like action but may be extended to implement production of any type of controllable action that attracts the attention of fish.

In the fish hook apparatus 100 disclosed herein, the fishing line 404 passes through the head member 101 and not through any eye element. The fish hook apparatus 100 disclosed herein is free of the eye element to which a fishing line is typically tied. In the fish hook apparatus 100 disclosed herein, the fishing line 404 is fed through the head member 101 via the channel 103 and tied to the securing element 110, which is inserted into the tail 501c of the bait 501. Tying the fishing line 404 to the tail 501c or another part of the bait 501 via the securing element 110 allows creation of a realistic action in the bait 501. When the angler slightly tugs the tip 401a of the fishing rod 401, the tail 501c of the bait 501 curls up towards the top nose element 102 of the head member 101, thereby creating a realistic curling action of a live worm in the bait 501. The fish hook apparatus 100 provides the angler with complete control of how and when the bait 501 curls.

Figure 7:
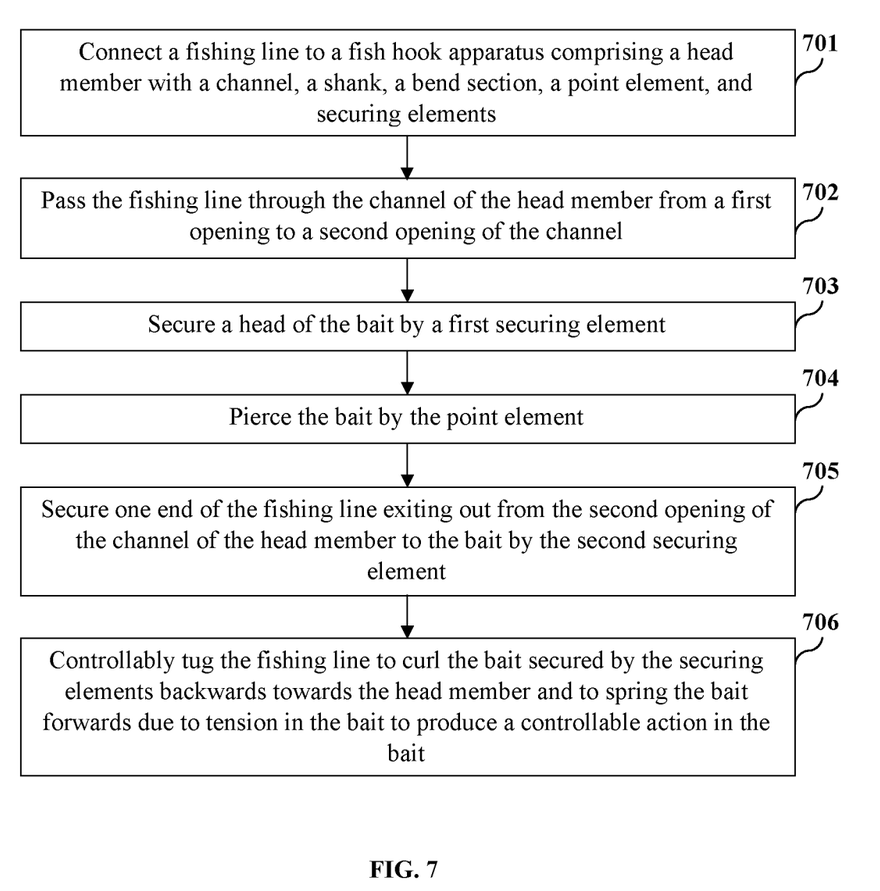
FIG. 7 illustrates a method for producing a controllable action in a bait, according to an embodiment herein.

FIG. 7 illustrates a method for producing a controllable action in a bait, according to an embodiment herein. A user, for example, an angler, connects 701 a fishing line to the fish hook apparatus 100 and passes 702 the fishing line through the channel of the head member from the first opening to the second opening as illustrated in FIG. 4. The angler then secures 703 the head of the bait using a securing element as illustrated in FIG. 5A. The angler then pierces 704 the body of the bait using the point element as illustrated in FIG. 5A and FIG. 5C. The angler then secures 705 one end of the fishing line exiting from the second opening of the channel of the head member using another securing element as illustrated in FIG. 5C. The angler then controllably tugs 706 the fishing line to curl the bait secured by the securing elements backwards towards the head member and to spring the bait forwards due to tension in the bait to produce a controllable action, for example, a curling, worm-like action in the bait as illustrated in FIGS. 6A-6E.

The fish hook apparatus and the method disclosed herein creates a fishing lure where the fishing line passes through the head member and attaches to the middle or tail of the bait. The fish hook apparatus disclosed herein allows an angler to be able to create an action in the bait without having to reel in their bait. The angler may slightly tug on the tip of the fishing rod, which makes the body or the tail of the bait move back and forth to produce a substantial action out of the bait, thereby allowing the angler to leave the bait in a particular area and move or provide action to the bait without having to reel in the bait. The angler may, therefore, leave the bait in the strike zone while the bait is moving. The fish hook apparatus disclosed herein is, therefore, useful in the fishing industry. Moreover, the fish hook apparatus provides the bait, for example, a worm or grub, with a realistic curl action rather than merely reeling or pulling the bait through the water. Furthermore, the fish hook apparatus allows the angler to have full and total control of how and when the bait acts or curls.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be executed and changes may be made thereto, without departing from the scope and spirit of the embodiments disclosed herein.

What is claimed is:

1. A fish hook apparatus and soft bait system comprising:
a weighted head member defining an upper nose, a lower surface, and a side wall extending from the upper nose to the lower surface, wherein a channel is defined through the weighted head member such that a first aperture of the channel is associated with the upper nose and a second aperture of the channel is associated with the side wall;
a first soft bait securing element extending beneath the lower surface of the weighted head member;
a hook extending beneath the lower surface of the weighted head member, wherein the hook comprises a shank, a bend section, and a point element;
a second soft bait securing element comprising an eyelet, wherein a diameter of the eyelet exceeds a diameter of the second aperture; and
a soft bait component defining a head end, a body portion, and a tail end;
wherein when:
the head end of the soft bait component is secured to the first soft bait securing element,
the point element of the hook is inserted into the body portion of the soft bait component,
the second soft bait securing element is secured to the tail end of the soft bait component, and
a fishing line is extended through the channel of the weighted head member and secured to the eyelet of the second soft bait securing element,
a pulling force applied to the fishing line will cause the soft bait component to bend such that the eyelet of the second soft bait securing element is received by, and mechanically stopped by, the second aperture.

2. The fish hook apparatus and soft bait system of claim 1, wherein at least one of the first and second soft bait securing elements comprises a corkscrew-type fastener.

3. The fish hook apparatus and soft bait system of claim 1, wherein at least one of the first and second soft bait securing elements comprises a hook-type fastener.

4. The fish hook apparatus and soft bait system of claim 1, wherein the weighted head member comprises lead.

5. The fish hook apparatus and soft bait system of claim 1, wherein the weighted head member is in the form of a cone.

6. The fish hook apparatus and soft bait system of claim 1, wherein the point element of the hook comprises a barb.

7. The fish hook apparatus and soft bait system of claim 1, wherein the soft bait component imitates a worm.

8. A fish hook apparatus and soft bait system comprising:
a weighted head member defining an upper nose, a lower surface, and a side wall extending from the upper nose to the lower surface, wherein a channel is defined through the weighted head member such that a first aperture of the channel is associated with the upper nose and a second aperture of the channel is associated with the side wall;
a first soft bait securing element extending beneath the lower surface of the weighted head member;
a hook extending beneath the lower surface of the weighted head member, wherein the hook comprises a shank, a bend section, and a point element;
a second soft bait securing element comprising an eyelet, wherein a diameter of the eyelet exceeds a diameter of the second aperture; and
a soft bait component defining a head end, a body portion, and a tail end;
wherein when:
the head end of the soft bait component is secured to the first soft bait securing element,
the point element of the hook is inserted into the body portion of the soft bait component,
the second soft bait securing element is secured to the body portion of the soft bait component, and
a fishing line is extended through the channel of the weighted head member and secured to the eyelet of the second soft bait securing element,
a pulling force applied to the fishing line will cause the soft bait component to bend such that the eyelet of the second soft bait securing element is received by, and mechanically stopped by, the second aperture.

9. The fish hook apparatus and soft bait system of claim 8, wherein at least one of the first and second soft bait securing elements comprises a corkscrew-type fastener.

10. The fish hook apparatus and soft bait system of claim 8, wherein at least one of the first and second soft bait securing elements comprises a hook-type fastener.

11. The fish hook apparatus and soft bait system of claim 8, wherein the weighted head member comprises lead.

12. The fish hook apparatus and soft bait system of claim 8, wherein the weighted head member is in the form of a cone.

13. The fish hook apparatus and soft bait system of claim 8, wherein the point element of the hook comprises a barb.

14. The fish hook apparatus and soft bait system of claim 8, wherein the soft bait component imitates a worm.

* * * * *